United States Patent
Nishimura et al.

(12)

(10) Patent No.: US 6,296,479 B1
(45) Date of Patent: Oct. 2, 2001

(54) DIRECT REDUCTION METHOD AND ROTARY HEARTH FURNACE

(75) Inventors: Makoto Nishimura, Kobe; Hidetoshi Tanaka, Kakogawa, both of (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 0 days.

(21) Appl. No.: 09/563,493

(22) Filed: May 3, 2000

(30) Foreign Application Priority Data

May 6, 1999 (JP) .................................................. 11-126330

(51) Int. Cl.⁷ .................................. F27B 9/16; F23B 7/00
(52) U.S. Cl. ............................ 432/138; 432/27; 110/233; 75/474; 75/477
(58) Field of Search ............................ 432/27, 135, 138, 432/139, 140; 110/233, 347; 75/474, 477, 487

(56) References Cited

U.S. PATENT DOCUMENTS

| | | | |
|---|---|---|---|
| 4,268,304 | * 5/1981 | Serbent et al. | 75/477 |
| 4,384,886 | * 5/1983 | Stift | 75/487 |
| 5,899,688 | * 5/1999 | Fontana | 432/139 |
| 5,989,019 | * 11/1999 | Nishimura et al. | 432/138 |

* cited by examiner

Primary Examiner—Gregory Wilson
(74) Attorney, Agent, or Firm—Oblon, Spivak, McClelland, Maier & Neustadt, P.C.

(57) ABSTRACT

Raw materials, including a metal oxide and a carbonaceous material, are supplied into a rotary hearth furnace. Then, the raw materials are heated and reduced by burners, which are arranged to cause a strong stirring action for an atmosphere around the raw materials, in an early reducing period that is defined as a period during which 70–80% of a total amount of a flammable gas generated from the raw materials is generated. In a latter period subsequent to the early reducing period, the raw materials are heated and reduced by burners arranged to cause a weak stirring action for an atmosphere around the raw materials, whereby a metal is manufactured. With the present invention, productivity can be improved and the fuel consumption per unit product can be reduced.

13 Claims, 6 Drawing Sheets

DIRECTION OF
MOVEMENT OF
RAW MATERIALS

DIRECT REDUCTION METHOD AND ROTARY HEARTH FURNACE

BACKGROUND OF THE INVENTION

1. Field of the Invention

The present invention relates to a direct reduction method and a rotary hearth furnace. More particularly, the present invention relates to a direct reduction method which can improve productivity and reduce the fuel consumption per unit product by effectively performing control of a heating atmosphere in a furnace, and relates to a rotary hearth furnace for carrying out the direct reduction method.

2. Description of the Related Art

Conventionally, there is known a process wherein raw materials, including a metal oxide or a mixture of a metal oxide and a carbonaceous material as reductant, e.g., coal, in the form of agglomerates, such as pellets and briquettes, are charged into a rotary hearth furnace, and the metal oxide in the raw materials undergoes direct reduction for recovery of a metal. The furnace is constructed such that heat is supplied to the raw materials from a plurality of burners in the direct reduction process. During the direct reduction process, the inside of the furnace is heated to and held at temperatures in the range of 1200–1500° C.

For the technique regarding direct reduction methods using rotary hearth furnaces, there is known a method of supplying a metal oxide, which contains a reluctant, to a rotary-hearth type calcining furnace for heating and reducing the metal oxide in the furnace, as disclosed in, for example, U.S. Pat. No. 4,622,905. In the disclosed method, multitype burners are installed on a side wall, and the furnace is operated under mixed combustion with pulverized coal to enhance emissive power of flames at or near an equivalence ratio 1.0.

U.S. Pat. No. 4,701,214 discloses that air in an amount required to burn a flammable gas generated from raw materials in association with reduction is fed as surplus air to burners installed on a side wall. The publication also discloses that the aforementioned atmosphere can be realized by the use of gaseous or liquid fuel and preheated combustion air.

According to the aforementioned related art, in manufacture of a metal, such as reduced iron, using a rotary hearth furnace, air is fed into the furnace by burners, which are installed on a side wall, in an amount near an equivalence ratio 1.0 relative to a flammable gas generated with burner combustion and reduction. Furthermore, in a walking-hearth type heating furnace for continuously heating raw materials, "end burners" or "roof burners" are employed as burners installed at the ceiling.

The inventors have also conducted studies on the structure of a rotary hearth furnace for many years, and have proposed a technique disclosed in Japanese Unexamined Patent Application Publication No. 10-60514 (U.S. Pat. No. 5,989,019). In the proposed technique, means for feeding a gas for secondary combustion to burn a flammable gas generated from objects to be heated is provided near a hearth below at least one of burners provided in an upper portion of a side wall. With this construction, the flammable gas generated with reduction can be burnt at high efficiency, and hence serves as a heat supply source for raw materials. As a result, an amount of fuel fed to the burners in the rotary hearth furnace is cut down, whereby the fuel consumption per unit product is reduced.

In the process of direct reduction from a metal oxide, by charging raw materials, including the metal oxide and a carbonaceous material, into a furnace and heating them, reduction reaction progresses and the metal oxide is reduced. When the raw materials are heated to temperatures of 1000° C. or higher during the process, reduction reaction rapidly progresses. Thus, in order to achieve high productivity, the raw materials require to be rapidly heated immediately after being charged into the furnace.

On the other hand, at the time the raw materials are charged into the furnace, a large amount of a flammable gas, containing $CO$, $H_2$, $CH_4$, etc., is generated. The amount of the flammable gas decreases with time and an amount of heat applied to the raw materials is changed correspondingly. More specifically, in a latter reducing period, a metal having been once reduced may be oxidized again (re-oxidized) by $CO_2$, $H_2O$, etc., which are contained in a combustion exhaust gas, due to a reduction in amount of the flammable gas generated from the raw materials and having a reducing action. For this reason, a reducing atmosphere must be maintained around the raw materials in the latter reducing period.

Moreover, because the fuel consumption per unit product in the process can be improved by utilizing, as a heat source, the flammable gas generated with reduction of the metal oxide, it is also important to burn the flammable gas generated from the raw materials in the furnace.

Thus, the following points have been recognized in the past; (1) reduction reaction of a metal oxide is accelerated by rapidly heating raw materials immediately after the raw materials are charged into a furnace, (2) a reducing atmosphere must be formed in a latter reducing period to prevent re-oxidization of the raw materials, and (3) the fuel consumption per unit product can be improved by burning a flammable gas generated from the raw materials. However, construction of a rotary hearth furnace and arrangement of burners for realizing the above points have not been established in the present state of the art.

According to the above-cited U.S. Pat. Nos. 4,622,905 and 4,701,214, for example, side burners provided on a side wall are employed in a rotary hearth furnace, and end burners arranged at the ceiling are employed in a walking-hearth type heating furnace. In the process wherein an amount of heat applied to raw materials is changed with time and an amount of the flammable gas generated from the raw materials is also changed, however, an effective approach to configuration of a rotary hearth furnace and installation of burners is not yet established.

SUMMARY OF THE INVENTION

An object of the present invention is to provide a direct reduction method which can improve productivity in a reducing process of a metal oxide by rapidly heating raw materials immediately after the raw materials are charged into a furnace, which forms a reducing atmosphere in a latter reducing period to prevent re-oxidization of the raw materials, and which can reduce the fuel consumption per unit product by burning a flammable gas generated from the raw materials, as well as to provide a rotary hearth furnace for carrying out the direct reduction method.

The direct reduction method of the present invention comprises the steps of supplying raw materials, including a metal oxide and a carbonaceous material, into a rotary hearth furnace; defining, as an early reducing period, a period during which 70–80% of a total amount of a flammable gas generated from the raw materials is generated, and heating and reducing the raw materials in the early reducing period by a first heating unit arranged to cause a strong stirring action for an atmosphere around the raw materials; and heating and reducing the raw materials in a latter period subsequent to the early reducing period by a second heating unit arranged to cause a weak stirring action for an atmosphere around the raw materials, that is to say, the action of keeping a reducing gas around the raw materials, whereby a metal is manufactured.

Also, according to the present invention, in a rotary hearth furnace for reducing raw materials, including a metal oxide and a carbonaceous material, to manufacture a metal, the rotary hearth furnace comprises a first heating unit causing a strong stirring action for an atmosphere around the raw materials, that is to say, the action to mix with a flammable gas and an oxidizing gas sufficiently, and arranged at a position inside the furnace corresponding to an early reducing period that is defined as a period during which 70–80% of a total amount of a flammable gas generated from the raw materials is generated; and a second heating unit causing a weak stirring action for an atmosphere around the raw materials and arranged at a position inside the furnace corresponding to a latter period subsequent to the early reducing period.

With the above features, in a direct reduction process of reducing a mixture of a metal oxide, coal, etc., productivity is improved by rapidly heating the raw materials in the early reducing period, a reducing atmosphere for preventing re-oxidization of the raw materials is established around the raw materials in the latter reducing period, and the fuel consumption per unit product is cut down by burning the flammable gas generated in association with reduction.

DESCRIPTION OF THE PREFERRED EMBODIMENTS

The construction, operation and advantages of the present invention will be described below with reference to the drawings.

Figure 1:
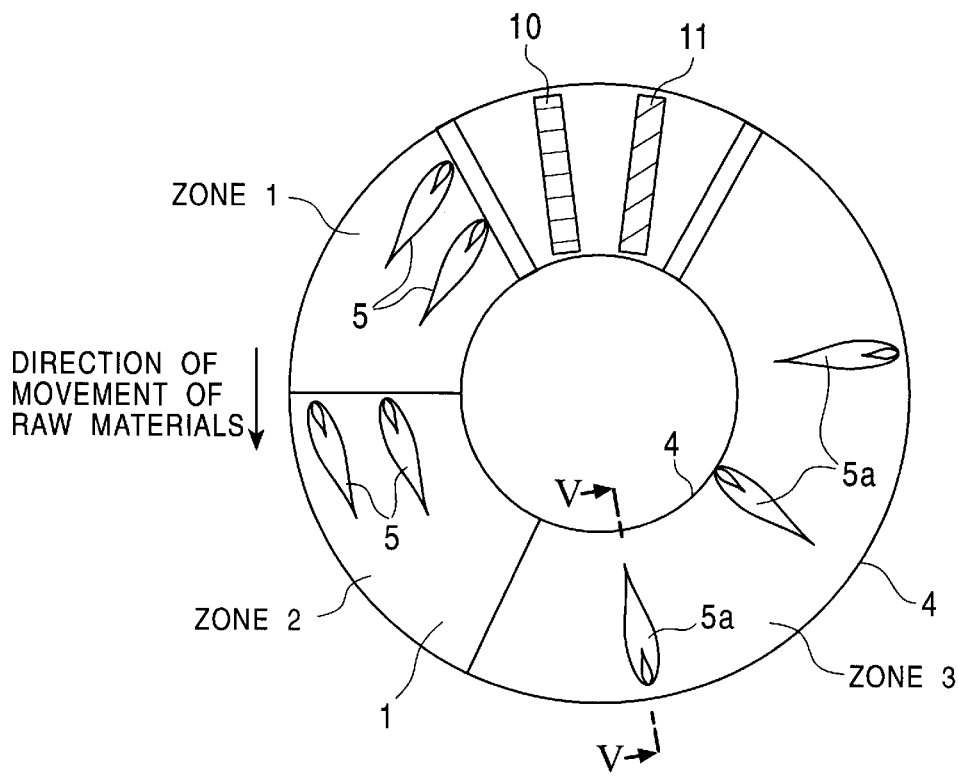
FIG. 1 is a plan view showing a construction of one embodiment of a rotary hearth furnace according to the present invention.
Figure 2:
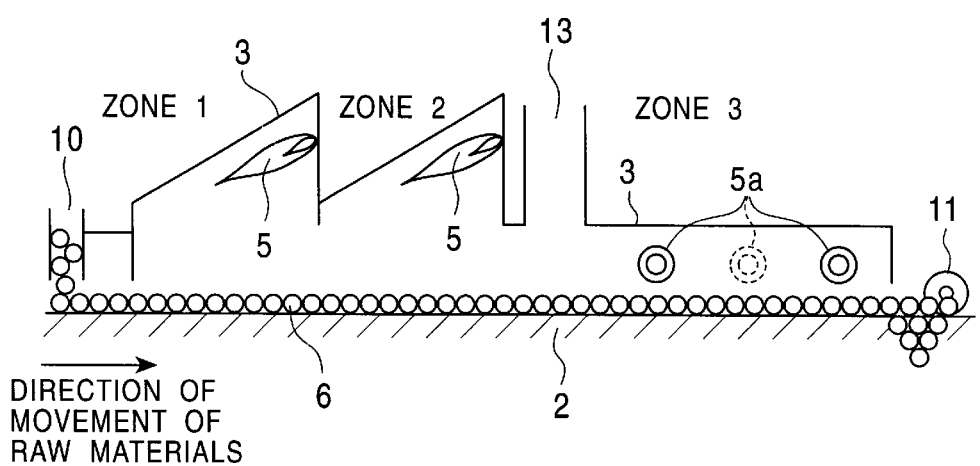
FIG. 2 is a developed view of the rotary hearth furnace shown in FIG. 1.

FIG. 1 is a plan view showing one exemplary construction of a rotary hearth furnace according to the present invention, and FIG. 2 shows, in the developed form, the rotary hearth furnace shown in FIG. 1. Referring to FIGS. 1 and 2, numeral 1 denotes a rotary hearth furnace, 2 denotes a hearth, 3 denotes a ceiling, 4 denotes a side wall, and 5, 5a each denote a burner or a supply pipe of oxidizing gas for combustion (hereinafter also abbreviated to "burner etc."). Numeral 6 denotes raw materials, 10 denotes a raw-material feeder, 11 denotes a product recovery apparatus, and 13 denotes a flue.

The rotary hearth furnace 1 shown in FIGS. 1 and 2 is constructed as follows. The raw materials 6 including a metal oxide and a carbonaceous material (such as coal) are supplied by the raw-material feeder 10 to the hearth 2 which is movable while rotating. The raw materials 6 are heated and reduced with flames generated by the burners etc. 5, 5a provided at the ceiling 3 and the side wall 4 within the rotary hearth furnace 1. A product (metal) obtained after reduction is recovered by the product recovery apparatus 11. The flue 13 shown in FIG. 2 is provided to discharge a burner combustion exhaust gas, a gas generated in association with reduction, and a combustion exhaust gas generated from the former gas.

In the rotary hearth furnace 1 thus constructed, the burners 5 are provided in the vicinity of the ceiling 3 at positions inside the furnace corresponding to an early heating period (early reducing period) for the raw materials 6 (i.e., at positions inside the furnace in zones 1 and 2) such that flames are generated in the obliquely downward direction. Further, the burners or oxidizing-gas-for-combustion supply pipes 5a are provided on the side wall 4 at positions inside the furnace corresponding to a latter reducing period for the raw materials 6 (i.e., at positions inside the furnace in zone 3) such that flames are generated in the horizontal direction. The burners 5 provided in the vicinity of the ceiling 3 cause a strong stirring action for an atmosphere around the raw materials 6, and the burners or oxidizing-gas-for-combustion supply pipes 5a provided on the side wall 4 cause a relatively weak stirring action for an atmosphere around the raw materials 6. The strong stirring action means mixing with a flammable gas and an oxidizing gas sufficiently. On the other hand, the relatively weak stirring action means keeping a reducing gas around the raw materials. Next, a description is made of the reason why the burners etc. 5, 5a cause different stirring actions, and of the operation advantages resulted from providing the burners etc. 5, 5a which cause different stirring actions.

Figure 3:
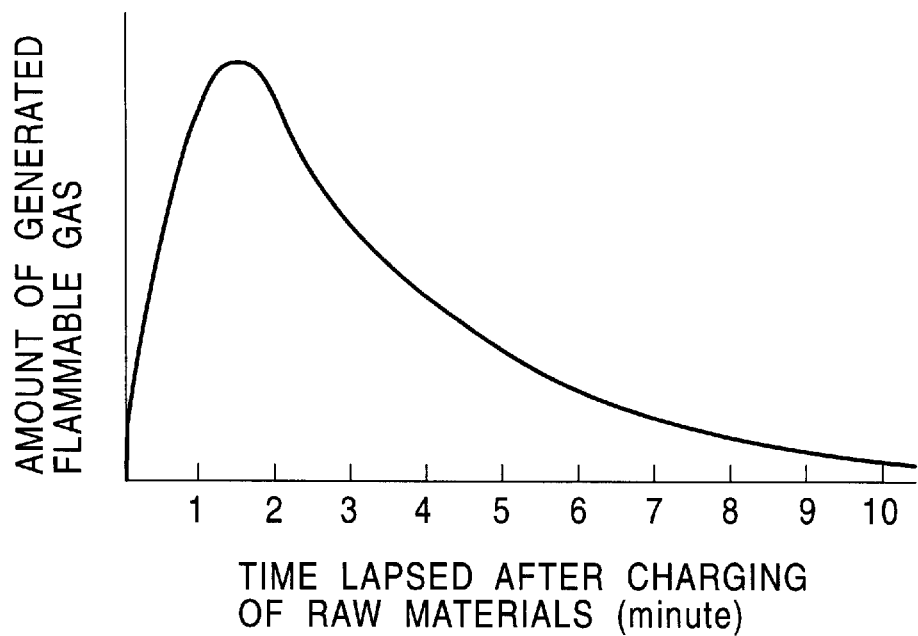
FIG. 3 is a graph showing changes in amount of a flammable gas after charging of raw materials.
Figure 4:
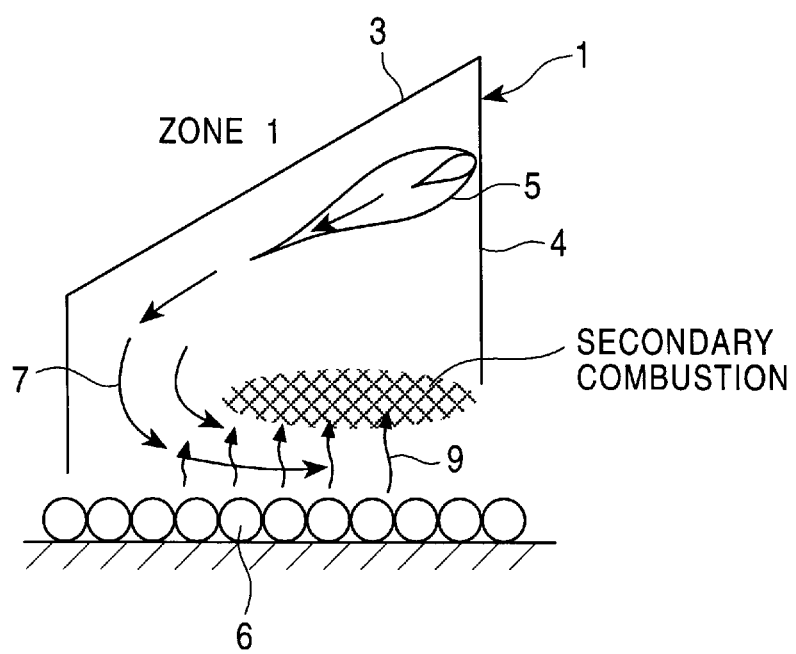
FIG. 4 is an explanatory view showing a vortex-produced state in zone 1 shown in FIGS. 1 and 2.

First, immediately after charging of the raw materials 6 into the furnace (i.e., at positions inside the furnace in zones 1 and 2 shown in FIGS. 1 and 2), a large amount of a flammable gas (containing CO, $H_2$, $CH_4$, etc.) is generated as shown in FIG. 3. By providing the burners etc. 5 in the vicinity of the ceiling 3 to accelerate the stirring action in zones 1 and 2 with the strong stirring action caused by the burners etc. 5, therefore, secondary combustion can be effectively accelerated. Specifically, where the burners etc. 5 are provided in the vicinity of the ceiling 3, as shown in FIG. 4, a gas flow in zone 1 (zone 2 as well) forms a vortex 7 in a section vertical to the circumferential direction and a flammable gas 9 generated from the raw materials 6 is strongly stirred, whereby the secondary combustion is accelerated.

When an amount of the raw materials 6 supplied to the furnace is increased, an amount of the flammable gas generated from the raw materials increases correspondingly. At the same time, the size of the rotary hearth furnace is also increased and a heat loss from a furnace wall per unit amount of the raw materials is reduced. In such a case, with an increase in amount of the raw materials supplied, a part of the burners 5 may be employed to eject only a combustion air without ejecting fuel and hence to serve as a supply pipe of oxidizing gas for combustion even in the early reducing period. Further, in the case where a large amount of the flammable gas is generated with an increase in amount of the raw materials 6 supplied, all of the burners 5 may be replaced by supply pipes of oxidizing gas for combustion. These supply pipes can also be realized by the burners through which only oxidizing gas is blown in without blowing in fuel.

Figure 5:
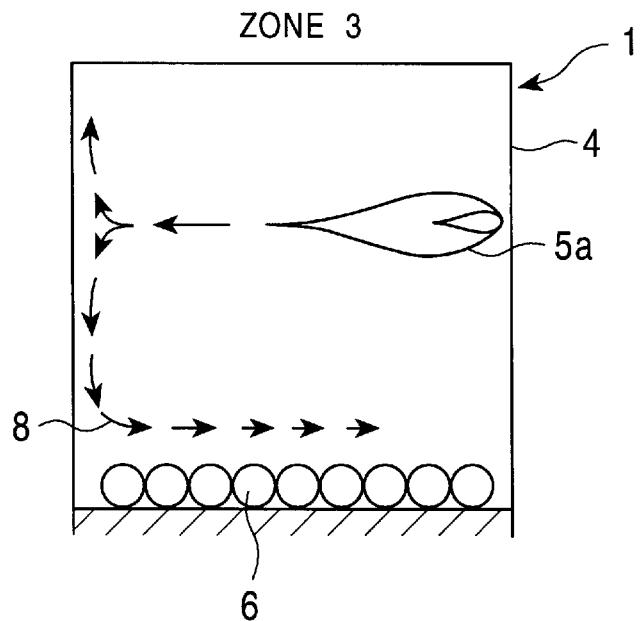
FIG. 5 is an explanatory view showing a vortex-produced state in zone 3 shown in FIGS. 1 and 2 (as viewed along the line V—V) in FIG. 1.

On the other hand, in zone 3 corresponding to a latter heating period (latter reducing period) for the raw materials, there is a risk that, because the flammable gas having a reducing action is generated in small amount (see FIG. 3), the raw materials 6 having been once reduced may be re-oxidized by $CO_2$, $H_2O$, etc. which are contained in a combustion exhaust gas, if stirring of the gas in zone 3 is accelerated. In the present invention, therefore, the burners or oxidizing-gas-for-combustion supply pipes 5a causing a relatively weak stirring action for an atmosphere around the raw materials 6 are provided in zone 3 corresponding to the latter reducing period. More specifically, as shown in FIG. 5 (sectional view as viewed along the line V—V in FIG. 1), the burners etc. 5a each produce a gas flow that strikes against an opposing wall and then spreads in the radial direction in zone 3. Therefore, the gas flow forms a small vortex 8 in the vicinity of the raw materials 6, and the stirring action developed by the burners etc. 5a becomes relatively weak. As a result, in zone 3, a fairly satisfactory reducing atmosphere is established so as to prevent re-oxidization of the raw materials, and the flammable gas generated from the raw materials is burnt to achieve a cut-down in the fuel consumption per unit product.

Further, in zone 3 corresponding to the latter reducing period (see FIG. 2), where an in-furnace gas containing a flammable gas flows from the end of a heating zone toward the flue 13, a part of the flammable gas can be used as fuel for heating the raw materials. In such a case, some of the plural burners etc. 5a may be replaced by supply pipes for supplying oxidizing gas (e.g., air) for combustion. As an alternative, the existing burners may be used in such a manner as to eject only combustion air through them without ejecting fuel. In this case, the existing burners can also develop the same function as the supply pipes of oxidizing gas for combustion.

Figure 11:
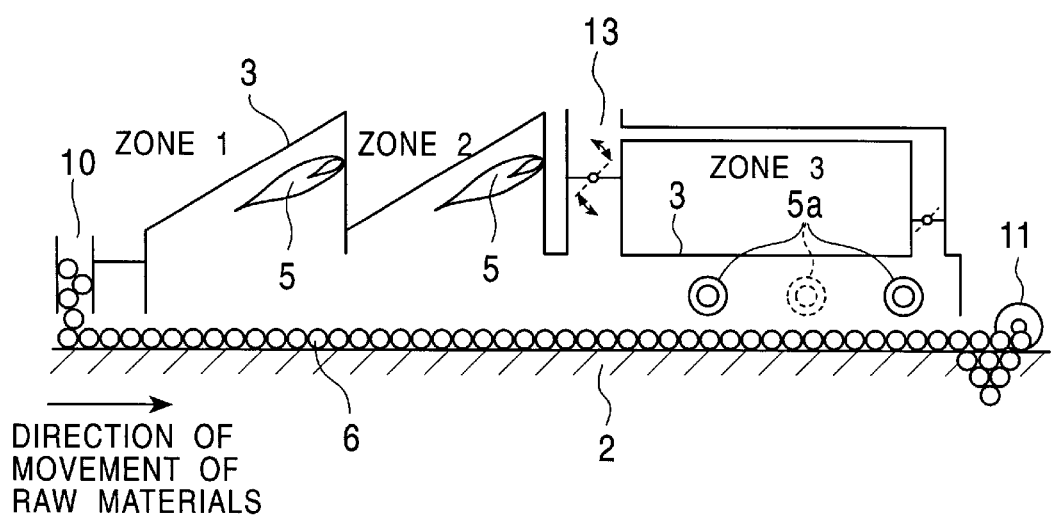
FIG. 11 is an explanatory view showing an embodiment in which a branch passage of a flue is provided near a discharge section of the rotary hearth furnace.

In the case where the flammable gas generated from the raw materials in the early reducing period can be effectively utilized in the latter reducing period, it is possible to replace all of the existing burners by supply pipes of oxidizing gas for combustion. In this connection, it is a matter of course that the existing burners can also serve as the supply pipes of oxidizing gas for combustion by ejecting only combustion air through the burners without ejecting fuel. As shown in FIG. 11, by way of example, by providing a branch passage of the flue 13 to be open to a discharge section and performing pressure control, the flammable gas generated from the raw materials in the early reducing period can be attracted to the latter reducing period. Also, where an exhaust gas drawing-out duct is provided near a discharge device for suction of the exhaust gas, all of the burners or oxidizing-gas-for-combustion supply pipes 5a can be likewise replaced by the supply pipes. Thus, means for utilizing the flammable gas is not particularly limited in structure thereof so long as the means enables the flammable gas generated from the raw materials in the early reducing period to be effectively utilized in the latter reducing period.

The word "burner" used herein means the so-called burner through which fuel (gas, liquid or solid) and oxidizing gas (including air, oxygen and oxygen-rich air) are both blown in for combustion. However, the burner can be used in such a manner as to eject only the oxidizing gas for burning the flammable gas generated from the raw materials depending on the reaction in the furnace. In this case, the burner develops the same function as the supply pipe of oxidizing gas for combustion.

The relationship between the strong and weak stirring actions caused by the burners etc. 5, 5a is relatively represented, and a ratio therebetween is not especially defined. To achieve the advantages of the present invention, however, it is preferable that the stirring action be developed as strong as possible in zones 1 and 2, while the stirring action be developed as weak as possible in zone 3.

In the present invention, as described above, a period for heating the interior of the furnace is divided into the early reducing period and the latter reducing period. Then, in the early reducing period, the raw materials are heated and reduced by the burners 5 causing the strong stirring action for the atmosphere around the raw materials 6. Thereafter, in the latter reducing period subsequent to the early reducing period, the raw materials are heated and reduced by the burners or oxidizing-gas-for-combustion supply pipes 5a causing the relatively weak stirring action for the atmosphere around the raw materials 6, whereby a metal is manufactured. In order to discriminate the early reducing period and the latter reducing period in the above process, the early reducing period is defined as a period during which 70–80% of a total amount of the flammable gas generated from the raw materials is generated, and a subsequent period is defined as the latter reducing period. The reason of so defining the two periods is as follows. In a period during which 70% of the total amount of the flammable gas generated from the raw materials is generated, i.e., in a period until the end of the early reducing period corresponding to its lower limit, re-oxidization of the raw materials 6 by $CO_2$, $H_2O$, etc., which are contained in the combustion exhaust gas, can be prevented by CO etc. generated from the raw materials. If the early reducing period is defined as a period during which 80% or more of the total amount of the flammable gas generated from the raw materials is generated, this increases a possibility that the raw materials may be re-oxidized by $CO_2$, $H_2O$, etc., which are contained in the combustion exhaust gas, due to a reduction in amount of CO etc. generated from the raw materials. Accordingly, in a period during which an amount of the flammable gas generated from the raw materials exceeds at least 80% of the total amount thereof, it is required to prevent re-oxidization of the raw materials by employing second heating means (burners etc. 5a) causing the relatively weak stirring action. In actual operation where most priority is given to a reduction in the fuel consumption per unit product, i.e., cost cut-down, a start point of the zone covered by the second heating means, i.e., of the latter reducing period, can be set to an earlier time. In such a case, the original object of reducing a metal oxide can be achieved, for example, by defining, as the early reducing period, a period during which 40% of the total amount of the flammable gas generated from the raw materials is generated, and employing the second heating means in a zone corresponding to a subsequent period. The reason is that, because the flammable gas generated from the raw materials is generated in large amount in an initial stage of the heating and reducing process, the generated flammable gas provides an effect particularly in the initial stage of the heating and reducing process, and switching to the second heating means can be made at the time at which an amount of the flammable gas generated from the raw materials reaches about 40% of the total amount thereof.

In designing the rotary hearth furnace while dividing a total reducing period into the early reducing period and the latter reducing period as described above, heating power of the burners 5 or the burners or oxidizing-gas-for-combustion supply pipes 5a is adjusted, for example, so that an amount of the flammable gas generated in zones 1 and 2 reaches 70–80% of the total amount thereof.

From the viewpoint of increasing productivity by rapidly heating and reducing the raw materials immediately after the raw materials are charged, the start time of the early reducing period is preferably set to a time immediately after charging of the raw materials. However, the present invention is not limited to such time setting, and the start time of the early reducing period can be set such that the heating and reducing process starts after the lapse of a certain time from charging of the raw materials. Thus, it is essential that the burners 5 causing the strong stirring action for the atmosphere around the raw materials are arranged in a zone of the furnace corresponding to a period during which 70–80% of the total amount of the flammable gas generated from the raw materials is generated.

Figure 6:
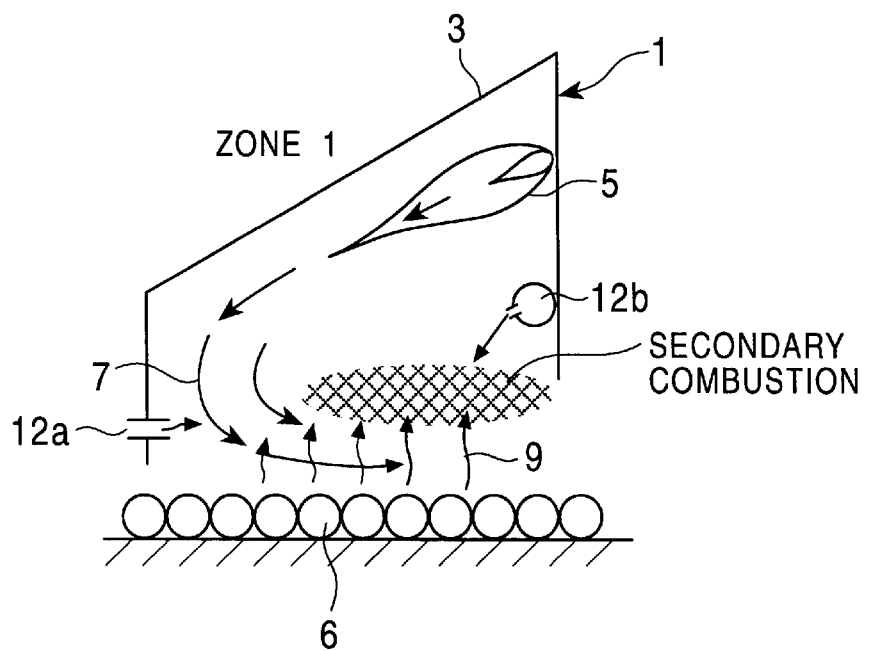
FIG. 6 is an explanatory view showing zone 1 in FIGS. 1 and 2 according to another embodiment.

FIG. 6 is an explanatory view showing zone 1 according to another embodiment. A construction of zone 1 in this embodiment differs from that shown in FIG. 4 in providing inlets 12a, 12b, through which oxidizing gas for combustion such as air is introduced, in the side wall 4 and the interior of the rotary hearth furnace 1. In the construction shown in FIG. 4, secondary combustion in zone 1 (zone 2 as well) is accomplished with surplus air from the burners 5. Providing the air inlets 12a, 12b to supply air for secondary combustion, as shown in FIG. 6, is advantageous in further accelerating the secondary combustion in cooperation with the action of the vortex 7 described above.

Figure 7:
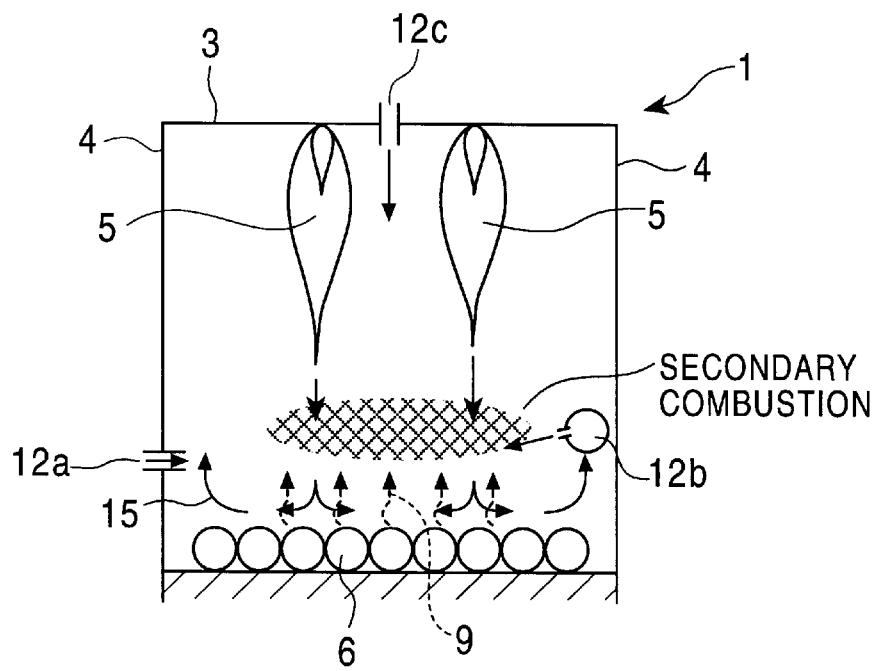
FIG. 7 is an explanatory view showing zone 1 in FIGS. 1 and 2 according to still another embodiment.

FIG. 7 is an explanatory view showing zone 1 according to still another embodiment. In a construction of this embodiment, roof-burner type burners 5 are installed at the ceiling 3. Also, in the construction of FIG. 7, air inlets 12a, 12b, 12c, etc. for secondary combustion are provided in the side wall 4, the ceiling 3 and/or the interior of the rotary hearth furnace 1. The use of such a construction also further accelerates the secondary combustion in zone 1.

The operation advantages of the present invention will be described below more concretely in conjunction with Examples. It is to be noted that the present invention is of course not limited to the following Examples, and the technical scope of the present invention involves any other forms in which the invention is implemented under different conditions etc. modified case by case as needed.

Also, a shape of the raw materials 6 used herein is a matter of choice. In other words, the raw materials may be in the form of agglomerates such as pellets and briquettes, or powder of the raw materials may be laid in the form of a layer on the hearth without molding the powder. As an alternative, powder of the raw materials may be laid on the hearth in a simply molded state, for example, obtained by lightly compacting the powder.

Further, a product (metal) having been reduced is not always required to be completely metallized, but may be in the form of sponge iron in which not-reduced portions remain. Additionally, the present invention involves the case of melting or fusing raw materials in the furnace and obtaining a metal.

EXAMPLES

Figure 8:
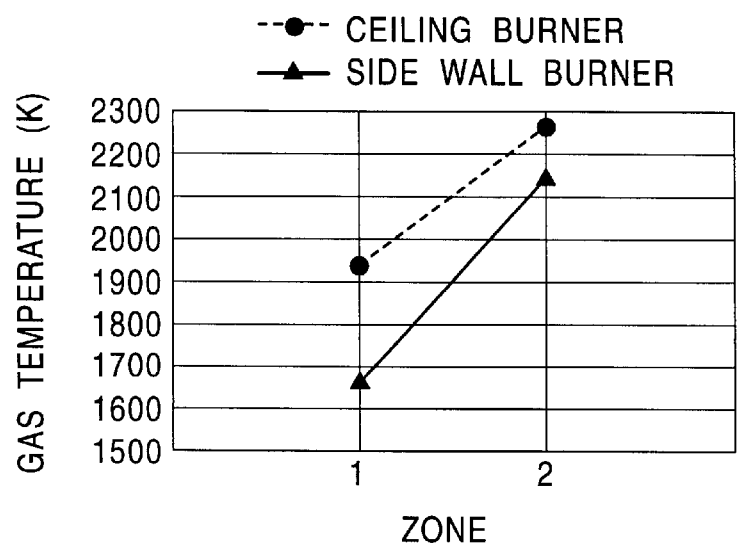
FIG. 8 is a graph showing gas temperatures in the vicinity of the raw materials for comparison between the cases of installing a ceiling burner and a side wall burner in zones 1 and 2 corresponding to an early reducing period.

Various experiments were made using the rotary hearth furnace shown in FIGS. 1 and 2. FIG. 8 is a graph showing gas temperatures (estimated average values based on numerical calculation) in the vicinity of the raw materials for comparison between the cases of installing a ceiling burner (end burner) and a side wall burner (side burner) in zones 1 and 2 corresponding to the early reducing period. Results of FIG. 8 were obtained by supplying the same amount of fuel to each burner. The results show that the average temperature in the vicinity of the raw materials in zone 1 is about 300 K. higher in the case of using the ceiling burner than the case of using the side wall burner. It is therefore understood that the use of the ceiling burner is more advantageous for the purpose of achieving rapid heating.

Figure 9:
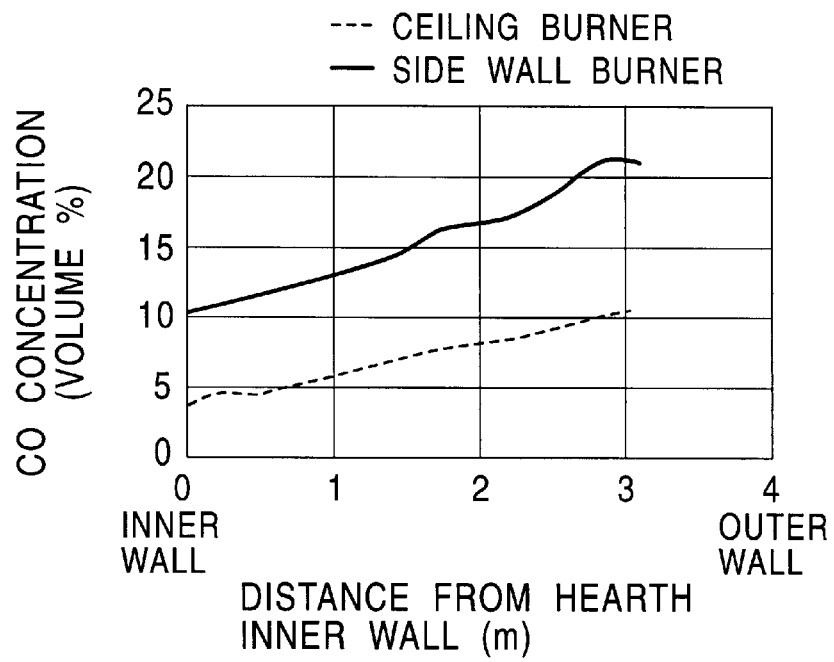
FIG. 9 is a graph showing CO concentrations in the vicinity of the raw materials for comparison between the case of installing a ceiling burner and a side wall burner in zone 3 corresponding a latter reducing period.

FIG. 9 is a graph showing CO concentrations (estimated average values based on numerical calculation) in the vicinity of the raw materials for comparison between the case of installing a ceiling burner (end burner) and a side wall burner (side burner) in zone 3 corresponding the latter reducing period. Results of FIG. 9 show distribution of the CO concentrations near the middle of the latter reducing period in the radial direction. As seen from the graph, the case of using the side wall burner provides a higher concentration of CO, i.e., a gas having a reducing action, than the case of using the ceiling burner in both inner and outer areas of the interior of the furnace. It is therefore understood that the use of the side wall burner is more advantageous for the purpose of preventing re-oxidization of the raw materials.

Figure 10:
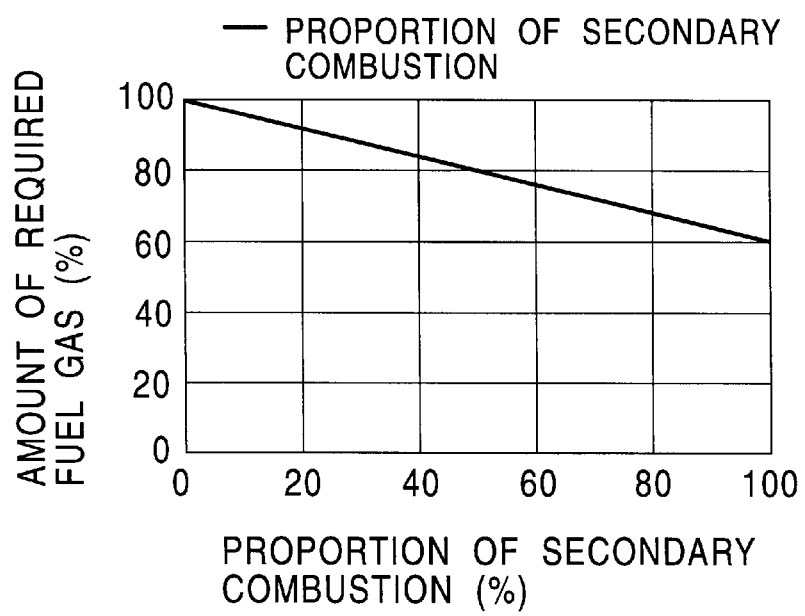
FIG. 10 is a graph showing the relationship between a proportion of secondary combustion and an amount of required fuel gas.

FIG. 10 is a graph showing a proportion at which secondary combustion is carried out in the furnace using the flammable gas generated from the raw materials, and a cut-down rate of amount of fuel gas required to be supplied to the furnace. The cut-down rate of amount of the required fuel gas was calculated taking as an example $Fe_2O_3$, i.e., one of metal oxides, by measuring an amount of fuel gas required to achieve a reaction in which $Fe_2O_3$ was reduced by carbon in an atmosphere of 1400° C. and decomposed into iron and carbon monoxide, and then measuring how the amount of fuel gas required to achieve such a reaction in the furnace was lowered by burning the carbon monoxide generated with reduction (secondary combustion) at different proportions.

As is apparent from results of FIG. 10, by burning the carbon monoxide generated with reduction at 100%, the amount of fuel gas supplied into the furnace can be cut down 40% in comparison with the case of not carrying out secondary combustion at all.

What is claimed is:

1. A direct reduction method comprising the steps of:
   supplying raw materials, including a metal oxide and a carbonaceous material, into a rotary hearth furnace;
   defining, as an early reducing period, a period during which 70–80% of a total amount of a flammable gas generated from the raw materials is generated, and heating and reducing the raw materials in the early reducing period by first heating means arranged to cause a strong stirring action for an atmosphere around the raw materials; and
   heating and reducing the raw materials in a latter period subsequent to the early reducing period by second heating means arranged to cause a weak stirring action for an atmosphere around the raw materials.

2. A direct reduction method according to claim 1, wherein said first heating means is a burner and/or an oxidizing gas for combustion.

3. A direct reduction method according to claim 1, wherein said second heating means is a burner and/or an oxidizing gas for combustion.

4. A rotary hearth furnace for reducing raw materials, including a metal oxide and a carbonaceous material, to manufacture a metal, said rotary hearth furnace comprising:

first heating means for creating a vortex to cause a strong stirring action for an atmosphere around the raw materials and arranged at a position inside said furnace corresponding to an early reducing period; and a second heating means for creating a vortex to cause a weak stirring action for an atmosphere around the raw materials and arranged at a position inside said furnace corresponding to a latter period subsequent to the early reducing period.

5. A rotary hearth furnace according to claim 4, wherein said first heating means is a burner and/or an oxidizing gas for combustion.

6. A rotary hearth furnace according to claim 4, wherein said second heating means is a burner and/or an oxidizing gas for combustion.

7. A rotary hearth furnace for reducing raw materials, including a metal oxide and a carbonaceous material, to manufacture a metal, said rotary hearth furnace comprising:

a first heating device having a discharge element positioned in the vicinity of a ceiling of said furnace and adapted to cause a strong stirring action for an atmosphere around the raw materials, the first heating device being arranged at a position inside said furnace corresponding to an early reducing period; and a second heating device having a discharge element positioned to cause a weak stirring action for an atmosphere around the raw materials and arranged at a position inside said furnace corresponding to a latter period subsequent to the early reducing period.

8. A rotary hearth furnace according to claim 7, wherein said discharge element of said first heating device is at least one of a burner and an oxidizing gas for combustion.

9. A rotary hearth furnace according to claim 7, wherein said discharge element of said second heating device is at least one of a burner and an oxidizing gas for combustion.

10. A rotary hearth furnace for reducing raw materials, including a metal oxide and a carbonaceous material, to manufacture a metal, said rotary hearth furnace comprising:

first heating means for generating flames in an obliquely downward direction, said first heating means being positioned in the vicinity of a ceiling of said furnace and at a position inside said furnace corresponding to an early reducing period; and second heating means positioned on a side wall of said furnace and at a position inside said furnace corresponding to a latter period subsequent to the early reducing period.

11. The rotary hearth furnace according to claim 10, wherein said first heating means causes a strong stirring action for an atmosphere around the raw materials and, wherein said early reducing period is defined as a period during which 70–80% of a total amount of a flammable gas generated from the raw materials is generated.

12. The rotary hearth furnace according to claim 10, wherein said second heating means causes a weak stirring action for an atmosphere around the raw materials.

13. A method for reducing raw materials, including a metal oxide and a carbonaceous material, to manufacture a metal in a rotary hearth furnace, comprising the steps of:

creating a vortex to cause a strong stirring action for an atmosphere around the raw materials at a position inside said furnace corresponding to an early reducing period; and creating a vortex to cause a weak stirring action for an atmosphere around the raw materials at a position inside said furnace corresponding to a latter period subsequent to the early reducing period.

* * * * *